Nov. 19, 1963 G. C. TRIPLETT 3,110,934
WALL MOUNTED TELEPHONE INSTALLATION
Filed Nov. 16, 1960 2 Sheets-Sheet 1

INVENTOR.
GEORGE C. TRIPLETT
BY
Mead, Browne, Schuyler & Beveridge
ATTORNEYS

Nov. 19, 1963 G. C. TRIPLETT 3,110,934

WALL MOUNTED TELEPHONE INSTALLATION

Filed Nov. 16, 1960 2 Sheets-Sheet 2

INVENTOR.
GEORGE C. TRIPLETT
BY
Mead, Browne, Schuyler & Beveridge
ATTORNEYS 3,110,934
United States Patent Office
Patented Nov. 19, 1963

3,110,934

WALL MOUNTED TELEPHONE INSTALLATION

George C. Triplett, Atlanta, Ga., assignor to Gladwin Plastics, Inc., Atlanta, Ga., a corporation of Georgia Filed Nov. 16, 1960, Ser. No. 78,798
4 Claims. (Cl. 20—3.5)

This invention relates to telephone installations, and more particularly to a knock-down unit for mounting and partially enclosing a telephone upon a vertical wall surface.

The invention is particularly directed to multi-unit public telephone installation structures such as are employed in railway and air terminals, lobbies, etc. In recent years, the trend in this particular field has been away from the completely enclosed telephone booth which has become impractical from the standpoint of construction costs. Recent developments in this field have been directed to arrangements in which a plurality of wall mounted telephones are employed, usually in association with a shelf. While construction costs of this latter type of installation are well below that of the completely enclosed booth, problems have arisen in keeping the costs of such installations down because of the fact that each installation must be custom designed in order to take into account the number of telephones needed as well as the amount and gengeral configuration of the available wall space.

In the usual case, a common shelf is provided for all telephones mounted along a given unobstructed portion of wall space. The fitting of a shelf or backboard to make optimum use of a given length of wall space is impractical from several standpoints. First, the installer must either maintain a large stock of shelves and backboards of various lengths corresponding to different numbers of telephone units or, alternatively, must custom build the shelves and backboards for each installation. Second, such units frequently run to substantial length and require the services of several men to effect the installation. Third, once installed, it is extremely difficult to add to, or decrease, the number of units in the event of an increase or decrease in telephone use demand at a particular installation. Fourth, the large components of such installations are awkward and expensive to ship if assembled at the factory while, at the same time, they are exceedingly difficult to assemble at the installation site if shipped in an unassembled condition.

In addition to the foregoing, such installations are generally expensive to repair and maintain since many of the component parts are custom made or dimensioned for a particular installation.

It is an object of the present invention to provide a knock-down unit adapted to be assembled into a multi-unit installation in serial fashion, each assembled unit being adapted to partially enclose a wall mounted telephone and to acoustically separate adjacent telephones from each other.

It is another object of the invention to provide a multi-unit telephone installation wherein individual knock-down units may be added or subtracted in accordance with use requirements.

It is another object of the invention to provide a multi-unit telephone installation wherein each unit is constructed from a plurality of standard components, each unit being constructed to cooperatively assist in the mounting of the next adjacent unit.

Still another object of the invention is to provide a knock-down unit for assembly into a multi-unit public telephone installation which may be easily installed by a single workman.

Still another object of the invention is to provide a multi-unit public telephone installation which is made up from a plurality of individual knock-down units, each knock-down unit consisting of a relatively small number of standard parts.

Other objects and features of the invention will become apparent by reference to the following specification taken in conjunction with the accompanying drawings.

Figures 1, 3, 4, 5:
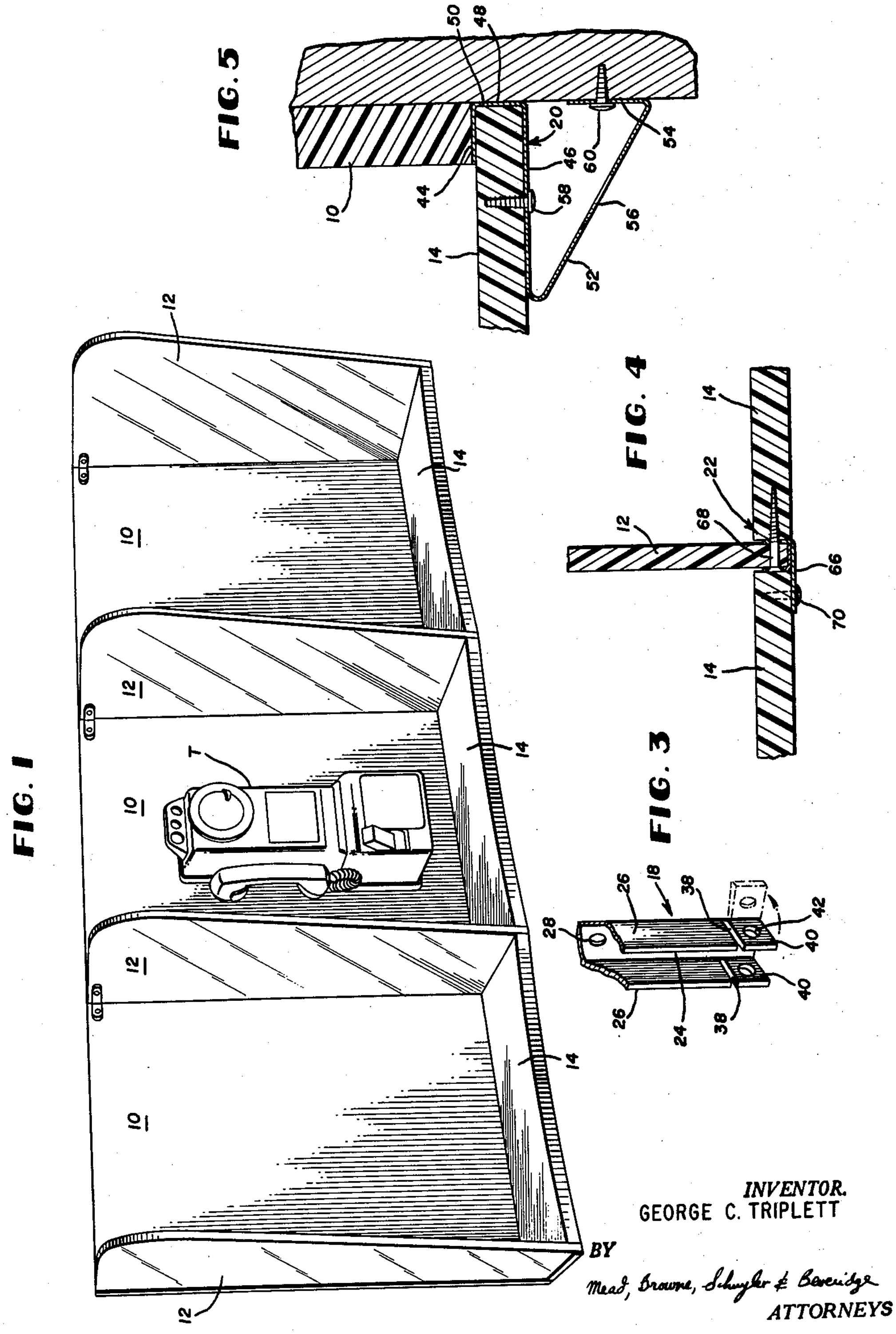
FIG. 1 is a perspective view of a multi-unit public telephone installation embodying the invention.
FIG. 3 is a detail perspective view of a portion of one of the mounting channels.
FIG. 4 is a detail front view showing the assembled relationship of certain portions of the structure.
FIG. 5 is a detail side elevational view.

In FIG. 1, a three-unit telephone installation embodying the invention is disclosed in its assembled relationship. Each unit consists basically of a backboard 10 upon which a telephone T is mounted, a side wall or partition 12 and a shelf 14. As is evident from FIG. 1, a plurality of units, when assembled in side-by-side relationship, provide a plurality of individual partially enclosed telephone installations separated from each other by partitions 12. While a three-unit installation is disclosed in FIG. 1, it is believed apparent that any number of units may be added in serial fashion in accordance with the use requirements. Partitions 12 are preferably constructed from a transparent or clear plastic sheet material. Backboards 10 may be surfaced with suitable sound absorbing materials such as carpeting, acoustical tile, etc.

Backboards 10, partitions 12 and shelves 14 are mounted in mutually perpendicular relationship upon a vertical wall surface by structure which, for each unit, includes a vertical channel 18, a shelf support 20, and a horizontal channel 22.

Channel 18 is an elongate member of substantially U shaped transverse cross-section having a central web 24 and integral perpendicularly projecting side webs or flange 26. Central web 24 is bored as at 28 (FIG. 3) at a suitable number of locations to provide openings through which mounting screws such as 30 may be passed to rigidly secure channel 18 to a vertical wall surface. Aligned bores 32 through side webs 26 provide openings through which attachment screws 34 may pass to fixedly secure partition 12 in place between side webs 26. The spacing between side webs 26 is selected so that the vertical side edge 36 of partition 12 is snugly received between side webs 26.

Referring now to FIG. 3, side webs 26 are slotted as at 38 so that the lowermost end portion of each web 26 may be bent outwardly as indicated in broken lines to define a pair of tabs 40 which are bored as at 42 to receive a mounting screw to interconnect channels 18 with shelf supports 20.

Shelf support 20 is formed with spaced upper and lower horizontal webs 44 and 46 (FIG. 5), interconnected by a vertical web 48. Lower web 46 is wider than upper web 44 and acts as a supporting surface for shelf 14. The thickness of shelf 14 is such that the inner edge 50 of shelf 14 is snugly received within the channel defined by webs 44, 46 and 48. A downwardly and inwardly inclined web 52 extends between the outer end of lower web 46 and an upwardly projecting vertical web 54. Web 52 is bored as at 56 to provide access openings for seating mounting screws 58 which pass through lower web 46 into shelf 14 to secure the shelf to shelf support 20. Access openings 56 also provide access to mounting screws 60 which pass through vertical web 54 to secure shelf support 20 to the wall surface upon which the assembly is mounted.

Upper web 44 and vertical web 48 project outwardly (FIG. 2) from each side of shelf support 20. The projecting portions of web 48 are bored as at 62 to receive a mounting screw 64 which passes through bore 62 and bore 42 in the vertical channel 18 at each end of shelf support 20.

Each horizontal channel 22 is of substantially U-shaped transverse cross section having the lower or horizontal web 66 (FIG. 4) projecting laterally outwardly from one side. As best seen in FIG. 4, the lower edge of partition 12 is received within channel 22 and is secured to the channel by a plurality of attachment screws 68 which pass through the side flanges of channel 22 and project into the adjacent side edge of one adjacent shelf 14. Webs 66 are bored to provide openings for attachment screws 70 which secure the other adjacent shelf 14 to channel 22 as best seen in FIG. 4.

In addition to the foregoing structure, angle members 72 may be provided to secure the upper ends of partitions 12 to the upper ends of backboard 10.

Each multi-unit installation consists of what may be termed an initial unit and a number of partial or intermediate units. The initial unit includes a complete set of all structural components shown in FIG. 2, namely one backboard 10, two partitions 12, one shelf 14, 2 channels 18, one shelf support 20, two channels 22, two angles 72 plus the required number of mounting screws. One initial unit is employed to construct a single unit installation. To increase the number of units in a given installation, partial units are added to the initial unit in the manner described below. Each partial unit consists of one backboard 10, one partition 12, one shelf 14, one channel 18, one shelf support 20, one channel 22, one angle 72 and the required mounting screws.

Normally, partitions 12 of the intermediate or partial units are in the form of plain flat plastic material which may be transparent or opaque. Frequently the partitions 12 of the initial unit are of a somewhat more ornamental nature. Where the partitions of the initial unit differ in appearance from those of the intermediate units, the two partitions of the initial unit are employed as end walls at the opposite ends of the multi-unit installation.

As the first step of the installation procedure, all of channels 18 are mounted upon the wall surface to which the unit is to be attached. At the conclusion of this step, all of the mounting tabs 40 are bent outwardly from their respective channels with the exception of the outer tabs on the endmost channels 18 as at 40A FIG. 2. Shelf supports 20 are then secured to the wall by screws 60 and 64, screws 64 passing through openings 62 in the shelf support and the respective aligned openings 42 in the laterally bent tabs 40 of channels 18. In this manner, each channel 18 is connected to both of the adjacent shelf supports 20.

Assembly of the shelves, partitions and backboards proceeds from one end of the installation to the other and may be started from either end.

Assuming the assembly is to be started from the right-hand end of the row of units, a partition 12 is then placed in the right-hand end channel unit 18 and secured in place by screws 34. If the partitions 12 of the initial unit differ in appearance from the partitions 12 of the intermediate units, one of the initial unit partitions is the first placed partition, while the other initial unit partition is held aside to be the last placed partition at the opposite end of the row. The endmost shelf 14 is then placed in its shelf support and secured by screws 58. A horizontal channel 22 is then fitted onto the lower edge of the secured partition 12 with its lateral tab projecting to the left beneath the mounted shelf 14. Screws 68 and 70 are then employed to secure channel 22 to the partition and shelf.

Figure 2:
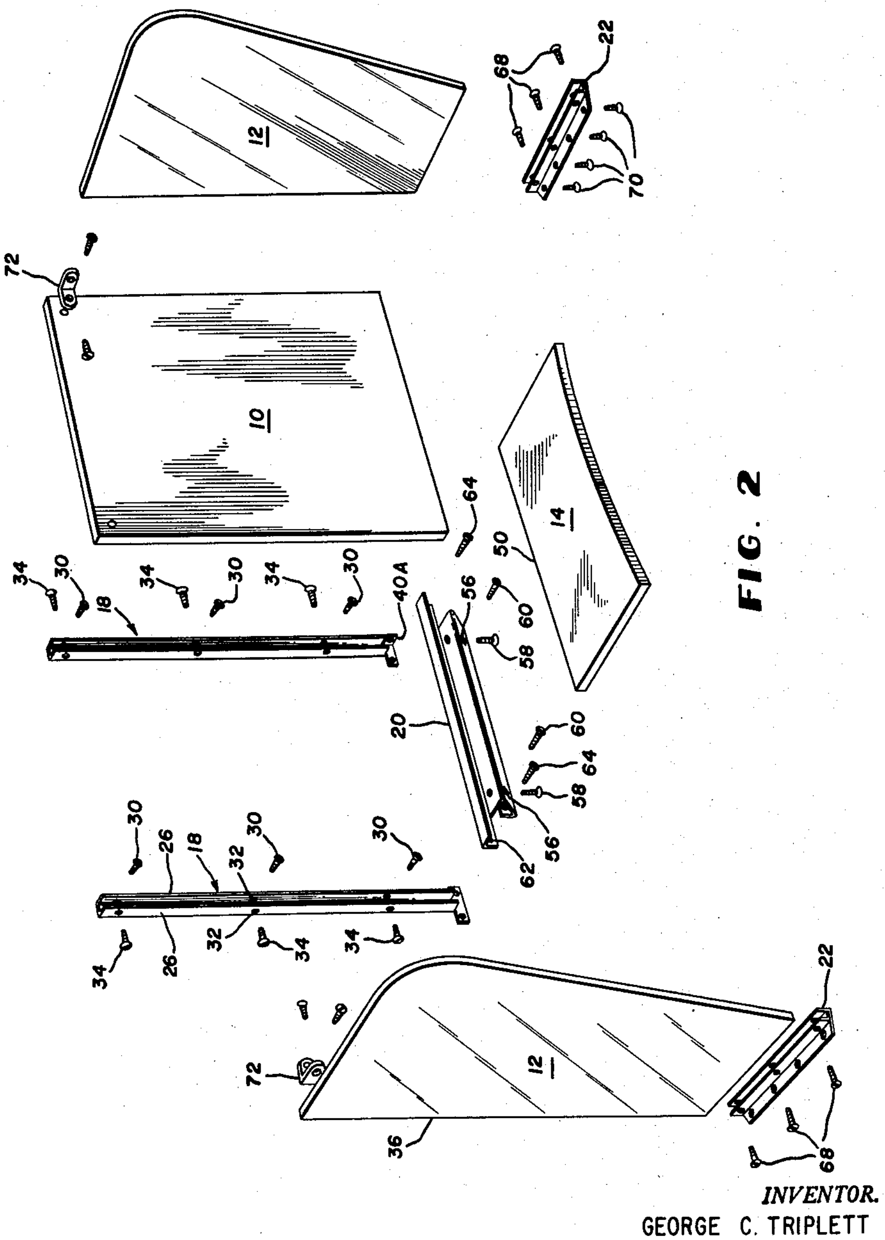
FIG. 2 is an exploded view of a portion of the structure of FIG. 1.

The next partition—the left-hand partition 12 of FIG. 2 is then placed in its channel 18 and secured to the channel by screws 34. Backboard 10 of the first unit is then secured in place by angle members 72 to each of the mounted partitions 12. Channel 22 is then fitted onto the lower edge of the second partition 12 and screws 68 are then placed to secure the left-hand partition 12 to channel 22 and also to secure the second channel 22 to the previously placed first shelf 14 (see FIG. 4). The lateral projection on the second channel 22 projects to the left so as to provide a support for the next shelf 14, as well as to provide a direct coupling between the first placed shelf 14 and the second placed shelf. The second shelf 14 is then attached in position to its shelf support 20 and to the previously placed second channel 22. This procedure is continued until the endmost unit at the opposite end of the row is assembled, the assembly of the unit at the left-hand end of the row differing from the previously assembled units in that the horizontal channel 22 is reversed so that its lateral web 66 projects to the right beneath the last placed shelf 14.

From the foregoing assembly procedure, it is apparent that the structure described above is readily adaptable to multi-unit installations, regardless of the number of particular units to be installed. Further, by virtue of the structural inter-relationship between the parts, a multi-unit installation may be made by a single workman, since none of the parts are especially bulky and because of the serial sequence of assembly. If it is desired to expand the installation, additional units may easily be added and conversely the number of units may be readily decreased by removing units in accordance with the use requirements of the installation.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. In a wall mounted multi-unit public telephone installation or the like wherein a plurality of individual horizontal shelves are disposed in end-to-end relationship along a wall and separated from each other by vertical partitions projecting outwardly from the wall between adjacent shelves; means for supporting a unit including at least one of said partitions and at least one of said shelves upon the wall in mutually perpendicular relationship to each other and to the wall, said supporting means comprising an elongate first channel member of substantially U-shaped transverse cross section mounted in vertically outwardly open relationship upon the wall, a vertical side edge of said partition mounted within said first channel member; means for securing said partition within said channel member; a shelf support mounted on the wall having a horizontally outwardly opening channel, a horizontal edge of said shelf mounted within said channel; a pair of laterally projecting tabs on the lower end of said first channel members; means securing one of said tabs to one end of said shelf support and to the wall; a second channel member mounted on the lower horizontal edge of said partition; means commonly securing said second channel member to said partition and to the adjacent side edge of said shelf; and a lateral web projecting horizontally from one side of said second channel member to define a support for the adjacent side edge of the shelf of an adjacent unit.

2. Apparatus as defined in claim 1 wherein said first channel member comprises a central web secured in face to face relationship with the wall and a pair of opposed side flanges projecting perpendicularly from opposite sides of said central web, both of said side flanges having a slot therethrough adjacent the lower end thereof to constitute said tabs as the portion of said side flanges below said slot.

3. A knock-down shelf unit comprising an elongate first channel member having a central web and opposed side flanges; means mounting said first channel member upon a vertical wall surface, said flanges being slotted adjacent the lower end of said first channel member to define a pair of tabs at the lower end of each side flange, each said tab having a mounting screw receiving opening and at least one of said tabs being bent outwardly to lie in the plane of said central web; a shelf support mounted on said wall having a pair of horizontal webs interconnected by a vertical web to define a channel, said vertical web having a mounting screw receiving opening adjacent each end thereof, one of said openings being positioned to overlie said screw receiving opening on said outwardly bent tab; means commonly securing said first channel member and said shelf support to the wall; a partition having a vertical side edge mounted between said flanges of said first channel member; a second channel member having a horizontal central web and vertically extending side webs secured to a horizontal lower edge of said partition, said second channel member having a laterally extending web; and a shelf member having a horizontal inner edge mounted between said horizontal webs of said shelf support member and a horizontal side edge mounted adjacent said second channel member and on top of said laterally extending web.

4. For use in constructing a wall mounted multi-unit public telephone installation; a knock-down unit comprising a vertically extending elongate channel member of substantially U-shaped transverse cross section having a central web and opposed side flanges, the lower end of at least one of said flanges being slotted and bent outwardly to define a tab; means securing said central web against a vertical wall surface; a shelf support having a vertical web; means mounting said support against a vertical wall surface in perpendicular relationship to said first channel member, one end of said web overlying and being attached to said tab; a partition having a vertical side edge mounted between said flanges of said first channel member; a second channel member of substantially U-shaped transverse cross section fitted over a horizontal lower edge of said partition, said second channel member having a horizontal shelf supporting web projecting laterally therefrom; a horizontal shelf having a horizontal back edge attached to said shelf support and a horizontal side edge attached to said second channel member; and a back board mounted adjacent to and in mutually perpendicular relationship with said partition and said shelf.

References Cited in the file of this patent

UNITED STATES PATENTS

| | | |
|---|---|---|
| 883,323 | Macduff | Mar. 31, 1908 |
| 1,599,252 | Simpson | Sept. 7, 1926 |
| 2,403,469 | Tucker | July 9, 1946 |
| 2,427,012 | Lum | Sept. 9, 1947 |
| 2,461,157 | Holden | Feb. 8, 1949 |
| 2,700,457 | Munroe | Jan. 25, 1955 |
| 2,700,475 | Stalter | Jan. 25, 1955 |

FOREIGN PATENTS

| | | |
|---|---|---|
| 19,857 | Great Britain | Oct. 18, 1894 |
| 441,318 | Great Britain | Jan. 16, 1936 |
| 825,152 | Germany | Dec. 17, 1951 |

OTHER REFERENCES

Sweets Catalog Service, Architectural Files, 1956, Section 32*a*/SU, last page, TH/A55/*s*8/C.2.